「12」 United States Patent
Amin et al.

(10) Patent No.: US 11,405,774 B2
(45) Date of Patent: Aug. 2, 2022

(54) COLLECTIVE ARTIFICIAL REALITY DEVICE CONFIGURATION

(71) Applicant: Facebook Technologies, LLC, Menlo Park, CA (US)

(72) Inventors: Ahmed Mohamed Eid Amin, Santa Clara, CA (US); Tristam Kyle MacDonald, Seattle, CA (US); Yuchen Zheng, Fremont, CA (US); Matthew O'neil Terrell, Redwood City, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 201 days.

(21) Appl. No.: 16/742,849

(22) Filed: Jan. 14, 2020

(65) Prior Publication Data

US 2021/0219132 A1  Jul. 15, 2021

(51) Int. Cl.
| | |
|---|---|
| *G06F 21/33* | (2013.01) |
| *G06T 19/00* | (2011.01) |
| *H04L 41/082* | (2022.01) |
| *H04W 76/15* | (2018.01) |
| *H04W 8/24* | (2009.01) |
| *H04W 4/02* | (2018.01) |

(Continued)

(52) U.S. Cl.
CPC ............ *H04W 8/245* (2013.01); *G06F 21/33* (2013.01); *G06T 19/006* (2013.01); *H04L 41/082* (2013.01); *H04L 41/0843* (2013.01); *H04W 4/023* (2013.01); *H04W 4/80* (2018.02); *H04W 76/15* (2018.02)

(58) Field of Classification Search
CPC ... H04L 25/16; H04L 33/0062; H04L 41/082; H04L 29/06; H04W 8/245; H04W 76/15; H04W 4/80; H04W 4/023; G06T 19/006; G06F 9/3893; G06F 9/30036; G06F 17/16; G06F 9/3001; H04R 3/00; H04R 1/10; H04N 5/23299; H04N 5/247
See application file for complete search history.

(56) References Cited

U.S. PATENT DOCUMENTS

11,039,651 B1 * 6/2021 Bosworth ............... H04S 7/303
2018/0122142 A1 * 5/2018 Egeler ................ G06F 16/5854
(Continued)

*Primary Examiner* — Iqbal Zaidi
(74) *Attorney, Agent, or Firm* — Potomac Law Group, PLLC (57) ABSTRACT

Provisioning multiple artificial reality devices can be accomplished through network communications between a device distributor, an administration system, a provisioning device, and the artificial reality devices. The device distributor can provide, to the administration system, a list of artificial reality devices corresponding to a particular organization. A provisioning device can sign into an account on the administration system and receive the list. The provisioning device can then scan for wireless connectivity with the listed artificial reality devices and can make a wireless connection with any artificial reality devices that respond and that are on the list. The provisioning device can then send these devices credentials for a local WiFi network. The artificial reality devices can automatically, upon receipt of the credentials, connect to the administration system to obtain the software update and/or the configuration data.

20 Claims, 7 Drawing Sheets

(51) Int. Cl.
*H04L 41/084* (2022.01)
*H04W 4/80* (2018.01)

(56) References Cited

U.S. PATENT DOCUMENTS

2020/0019288 A1\* 1/2020 D'Amore ............. G06Q 10/101
2020/0404016 A1\* 12/2020 Pike ..................... H04L 43/065

\* cited by examiner

COLLECTIVE ARTIFICIAL REALITY DEVICE CONFIGURATION

TECHNICAL FIELD

The present disclosure is directed to the automatic setup and configuration of artificial reality devices using wireless networks.

BACKGROUND

Artificial reality devices provide users the ability to experience different worlds, learn in new ways, and make better connections with others. With these artificial reality systems come new interaction flows and opportunities to integrate with other systems. For example, artificial reality systems are being used by enterprises to train employees, provide computer augmented quality control, provide automated process guidance in lengthy procedures, and provide design overlays. As these devices become more ubiquitous, organization technology administrators are spending more and more time provisioning these devices with software updates and configuration data.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Embodiments for provisioning multiple artificial reality devices assigned to an organization using an automated process over a wireless connection are described herein. The provisioning can include providing the artificial reality device with either or both of a software update (which can include a firmware update) or configuration data. In various implementations, the configuration data can be selections from an administrator, a default set of configurations, configurations custom to a list of devices (e.g., devices assigned to the same organization), etc. A set of artificial reality devices to be provisioned can be determined through coordination with a device distributor, such as a manufacturer or sales department that tracks artificial reality device identifiers for the artificial reality devices that have been provided to a particular organization. Lists of the artificial reality devices corresponding to particular organizations can be provided to an administration system that provides the software updates and/or configuration data. For example, various accounts with the administration system can be associated with the organization and can have an identifier signifying that account is authorized to perform device provisioning operations. In some implementations, this can allow the user of the account to specify various configuration setting groups that the user can select to apply to artificial reality devices during provisioning.

The provisioning process can include authenticating, at a provisioning device, an account with the administration system. This account can be the account associated with an organization for which the device distributor previously provided a list of devices. The administration system can verify the account, retrieve the list of artificial reality devices for the organization associated with the account, and provide the list of artificial reality devices to the provisioning device. The provisioning device can scan for wireless connectivity with the listed artificial reality devices, e.g., using a Bluetooth or other wireless connection. Artificial reality devices can respond to the wireless scan, providing an artificial reality device identifier that the provisioning device can match up to its list of artificial reality devices. The provisioning device can make a wireless connection with any artificial reality devices that respond and that are on the list. Due to the limited wireless range of wireless connections, any artificial reality devices that respond to the scan are known to be within a maximum geographical area from the provisioning device. The provisioning device can also notify the administration system of these artificial reality devices that are local to the provisioning device, allowing the administration system to set a confirmed state for these artificial reality devices. The provisioning device can set up the wireless connection (e.g., via Bluetooth) with the located artificial reality devices on the list and send them credentials for a local network (e.g., WiFi). The artificial reality devices can be configured to automatically, upon receipt of credentials, connect to the administration system (by virtue of an address for the administration system being either pre-programmed into the artificial reality device or received from the provisioning device) to obtain the software update and/or the configuration data.

Embodiments of the disclosed technology may include or be implemented in conjunction with an artificial reality system. Artificial reality or extra reality (XR) is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real world after they have passed through a computing system. For example, a tablet with a camera on the back can capture images of the real world and then display the images on the screen on the opposite side of the tablet from the camera. The tablet can process and adjust or "augment" the images as they pass through the system, such as by adding virtual objects. "Mixed reality" or "MR" refers to systems where light entering a user's eye is partially generated by a computing system and partially composes light reflected off objects in the real world. For example, a MR headset could be shaped as a pair of glasses with a pass-through display, which allows light from the real world to pass through a waveguide that simultaneously emits light from a projector in the MR headset, allowing the MR headset to present virtual objects intermixed with the real objects the user can see. "Artificial reality," "extra reality," or "XR," as used herein, refers to any of VR, AR, MR, or any combination or hybrid thereof.

Some existing groups of artificial reality devices are associated with organizations, yet the technology administrators for those organizations are required to manually provision each device to provide network credentials for software updates and configuration data. The provisioning system and processes described herein are expected to overcome these problems associated with existing administered artificial reality devices, and provide organizations with faster and more secure provisioning processes. For example, many existing provisioning procedures cannot take advantage of XR device features such as built-in integrations between mobile device applications and the artificial reality devices. Furthermore, existing artificial reality devices do not allow a system administrator to effectively control batching authentication procedures for groups of devices nor do they tie them into available systems, such as device distributors and centralized administration systems. In Contrast, the provisioning system and processes described herein can utilize interfaces between multiple artificial reality devices and provisioning devices to automatically provide credentials and provisioning data.

Figure 1:
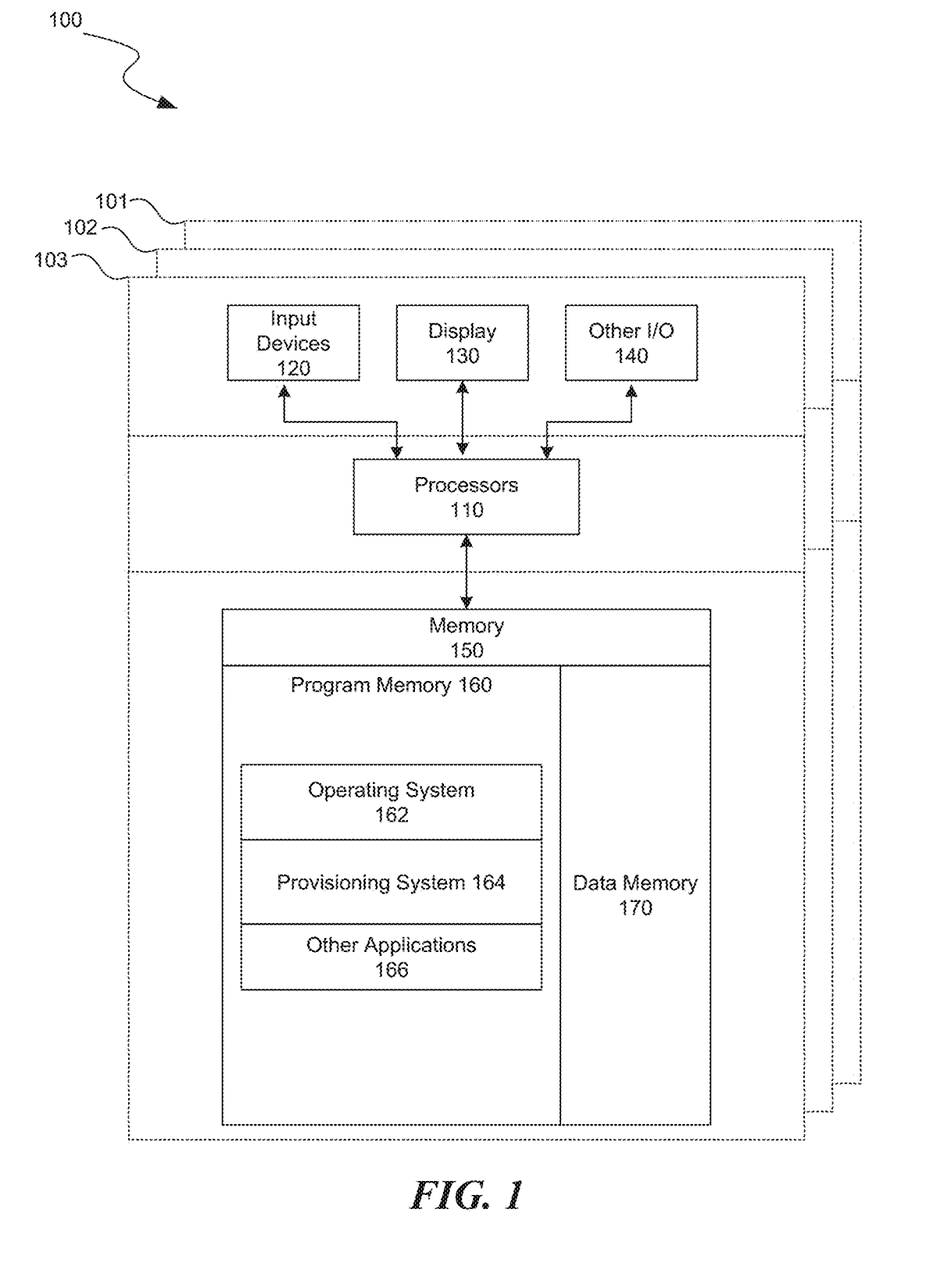
FIG. 1 is a block diagram illustrating an overview of devices on which some implementations of the present technology can operate.

Several implementations are discussed below in more detail in reference to the figures. FIG. 1, for example, is a block diagram illustrating an overview of devices on which some implementations of the disclosed technology can operate. In some cases, the devices can comprise hardware components of a provisioning device 100 that can administer provisioning for local artificial reality devices using a device listing from an administration system in conjunction with a device distributor. In other cases, the devices can comprise hardware components of an artificial reality device computing system 100 to be provisioned via interactions with the provisioning device. In yet other cases, the devices can comprise hardware components of the administration system 100 that interfaces with the device distributor, keeps artificial reality device lists in association with user accounts, provides account authentication services, and provides software updates and configuration data for artificial reality devices.

In various implementations, computing system 100 can include a single computing device 103 or multiple computing devices (e.g., computing device 101, computing device 102, and computing device 103) that communicate over wired or wireless channels to distribute processing and share input data. In some implementations, computing system 100 can include a stand-alone headset capable of providing a computer created or augmented experience for a user without the need for external processing or sensors. In other implementations, computing system 100 can include multiple computing devices such as a headset and a core processing component (such as a console, mobile device, or server system) where some processing operations are performed on the headset and others are offloaded to the core processing component. Example headsets are described below in relation to FIGS. 2A and 2B. In some implementations, position and environment data can be gathered only by sensors incorporated in the headset device, while in other implementations one or more of the non-headset computing devices can include sensor components that can track environment or position data.

Computing system 100 can include one or more processor(s) 110 (e.g., central processing units (CPUs), graphical processing units (GPUs), holographic processing units (HPUs), etc.) Processors 110 can be a single processing unit or multiple processing units in a device or distributed across multiple devices (e.g., distributed across two or more of computing devices 101-103).

Computing system 100 can include one or more input devices 120 that provide input to the processors 110, notifying them of actions. The actions can be mediated by a hardware controller that interprets the signals received from the input device and communicates the information to the processors 110 using a communication protocol. Each input device 120 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, or other user input devices.

Processors 110 can be coupled to other hardware devices, for example, with the use of an internal or external bus, such as a PCI bus, SCSI bus, or wireless connection. The processors 110 can communicate with a hardware controller for devices, such as for a display 130. Display 130 can be used to display text and graphics. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network chip or card, video chip or card, audio chip or card, USB, firewire or other external device, camera, printer, speakers, CD-ROM drive, DVD drive, disk drive, etc.

Computing system 100 can include a communication device capable of communicating wirelessly or wire-based with other local computing devices or a network node. The communication device can communicate with another device or a server through a network using, for example, TCP/IP protocols. Computing system 100 can utilize the communication device to distribute operations across multiple network devices.

The processors 110 can have access to a memory 150, which can be contained on one of the computing devices of computing system 100 or can be distributed across of the multiple computing devices of computing system 100 or other external devices. A memory includes one or more hardware devices for volatile or non-volatile storage, and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, provisioning system 164, and other application programs 166. Memory 150 can also include data memory 170 that can include, e.g., artificial reality device lists, user account data, various credentials and/or authentication tokens, artificial reality device state identifiers, software updates, configuration data, settings, user options or preferences, etc., which can be provided to the program memory 160 or any element of the computing system 100.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2A:
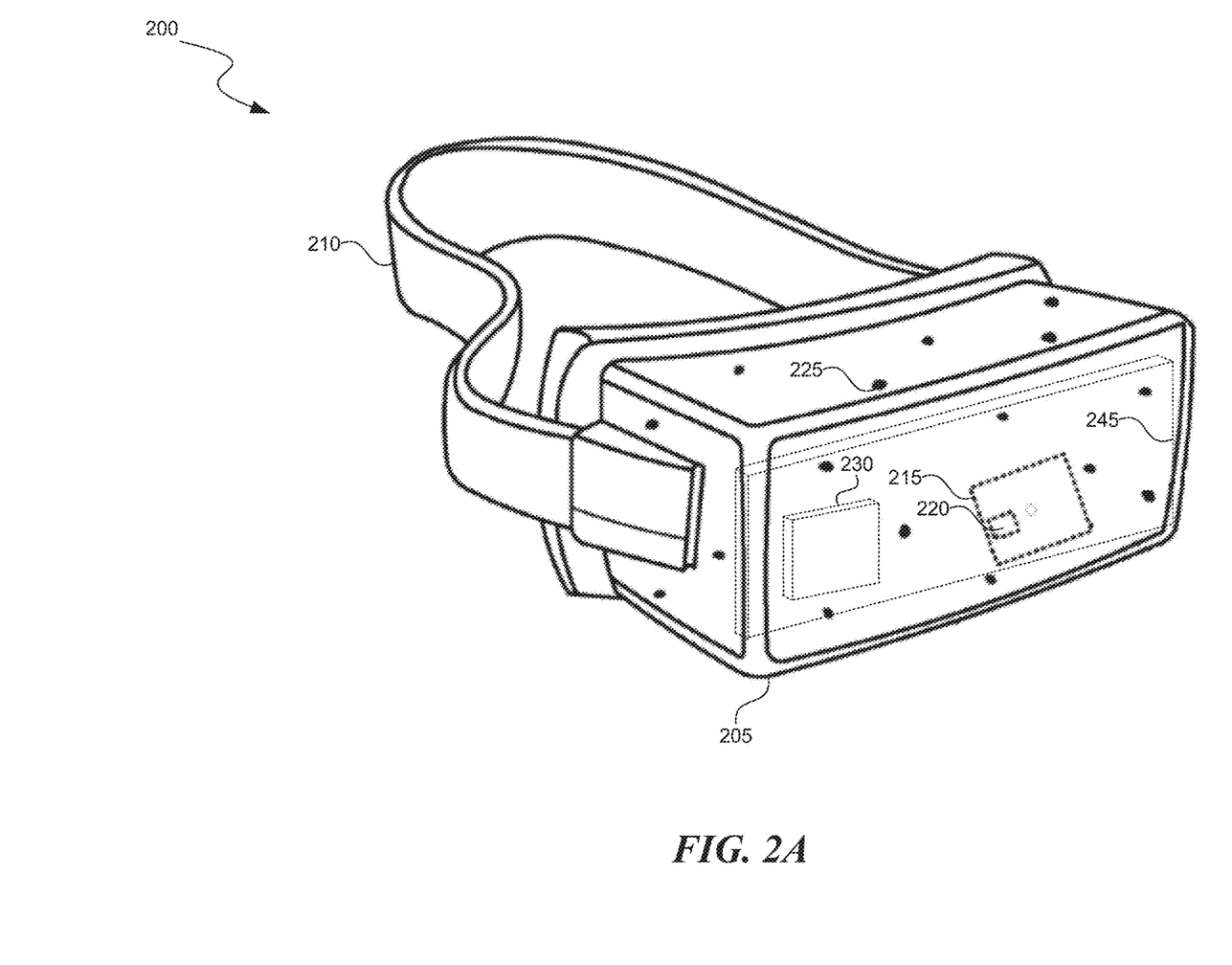
FIG. 2A is a wire diagram illustrating a virtual reality headset which can be used in some implementations of the present technology.

FIG. 2A is a wire diagram of a virtual reality head-mounted display (HMD) 200, in accordance with some embodiments. The HMD 200 includes a front rigid body 205 and a band 210. The front rigid body 205 includes one or more electronic display elements of an electronic display 245, an inertial motion unit (IMU) 215, one or more position sensors 220, locators 225, and one or more compute units 230. The position sensors 220, the IMU 215, and compute units 230 may be internal to the HMD 200 and may not be visible to the user. In various implementations, the IMU 215, position sensors 220, and locators 225 can track movement and location of the HMD 200 in the real world and in a virtual environment in three degrees of freedom (3DoF) or six degrees of freedom (6DoF). For example, the locators 225 can emit infrared light beams which create light points on real objects around the HMD 200. One or more cameras (not shown) integrated with the HMD 200 can detect the light points. Compute units 230 in the HMD 200 can use the detected light points to extrapolate position and movement of the HMD 200 as well as to identify the shape and position of the real objects surrounding the HMD 200.

The electronic display 245 can be integrated with the front rigid body 205 and can provide image light to a user as dictated by the compute units 230. In various embodiments, the electronic display 245 can be a single electronic display or multiple electronic displays (e.g., a display for each user eye). Examples of the electronic display 245 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, Ladministration systemER, etc.), some other display, or some combination thereof.

In some implementations, the HMD 200 can be coupled to a core processing component such as a personal computer (PC) (not shown) and/or one or more external sensors (not shown). The external sensors can monitor the HMD 200 (e.g., via light emitted from the HMD 200) which the PC can use, in combination with output from the IMU 215 and position sensors 220, to determine the location and movement of the HMD 200.

In some implementations, the HMD 200 can be in communication with one or more other external devices, such as controllers (not shown) which a user can hold in one or both hands. The controllers can have their own IMU units, position sensors, and/or can emit further light points. The HMD 200 or external sensors can track these controller light points. The compute units 230 in the HMD 200 or the core processing component can use this tracking, in combination with IMU and position output, to monitor hand positions and motions of the user. The controllers can also include various buttons a user can actuate to provide input and interact with virtual objects. In various implementations, the HMD 200 can also include additional subsystems, such as an eye tracking unit, an audio system, various network components, etc. In some implementations, instead of or in addition to controllers, one or more cameras included in the HMD 200 or external to it can monitor the positions and poses of the user's hands to determine gestures and other hand and body motions.

Figure 2B:
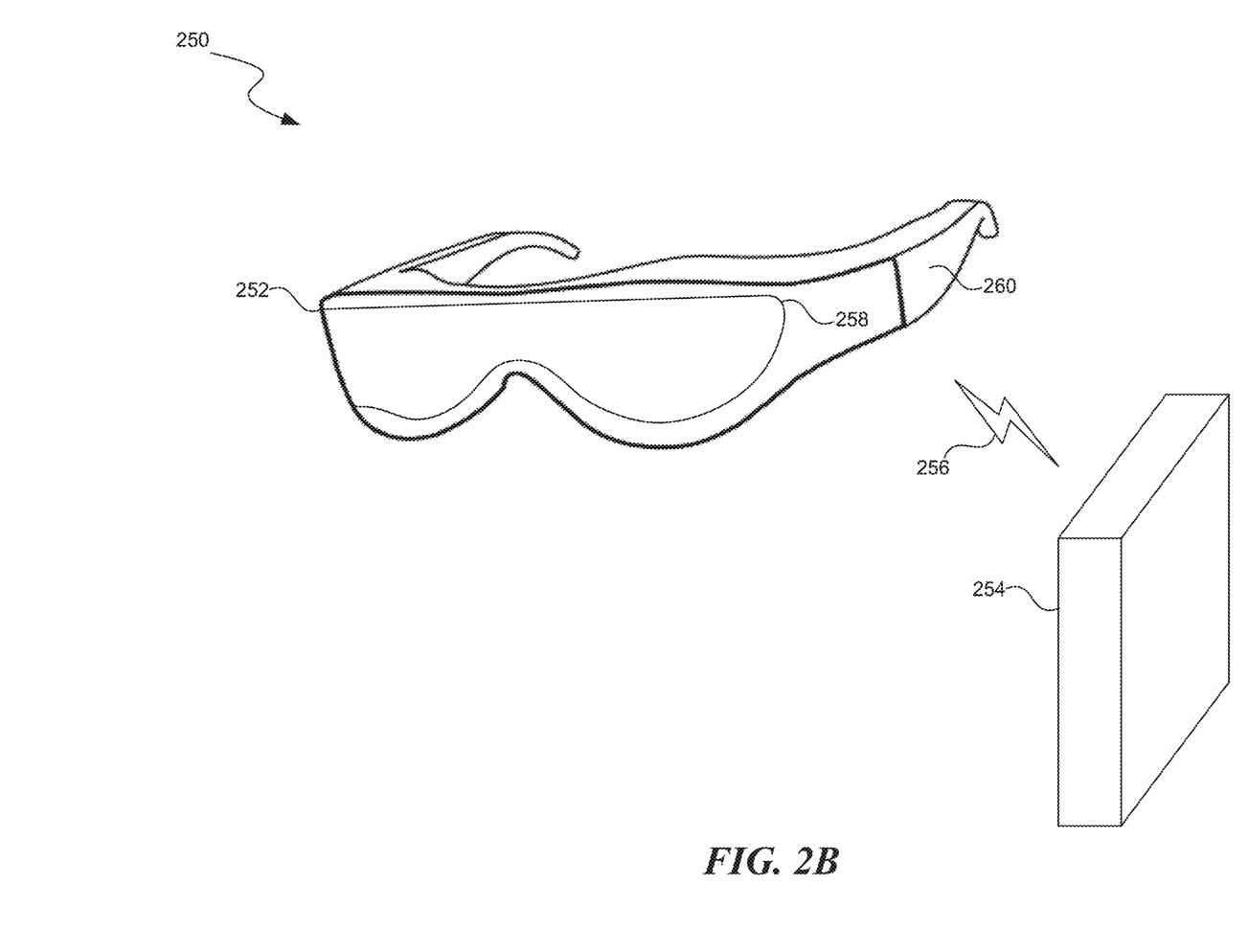
FIG. 2B is a wire diagram illustrating a mixed reality headset which can be used in some implementations of the present technology.

FIG. 2B is a wire diagram of a mixed reality HMD system 250 which includes a mixed reality HMD 252 and a core processing component 254. The mixed reality HMD 252 and the core processing component 254 can communicate via a wireless connection (e.g., a 60 GHz link) as indicated by link 256. In other implementations, the mixed reality system 250 includes a headset only, without an external compute device or includes other wired or wireless connections between the mixed reality HMD 252 and the core processing component 254. The mixed reality HMD 252 includes a pass-through display 258 and a frame 260. The frame 260 can house various electronic components (not shown) such as light projectors (e.g., Ladministration systemERs, LEDs, etc.), cameras, eye-tracking sensors, MEMS components, networking components, etc.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 254 via link 256 to HMD 252. Controllers in the HMD 252 can convert the image data into light pulses from the projectors, which can be transmitted via the optical elements as output light to the user's eye. The output light can mix with light that passes through the display 258, allowing the output light to present virtual objects that appear as if they exist in the real world.

Similarly to the HMD 200, the HMD system 250 can also include motion and position tracking units, cameras, light sources, etc., which allow the HMD system 250 to, e.g., track itself in 3DoF or 6DoF, track portions of the user (e.g., hands, feet, head, or other body parts), map virtual objects to appear as stationary as the HMD 252 moves, and have virtual objects react to gestures and other real-world objects.

Figure 3:
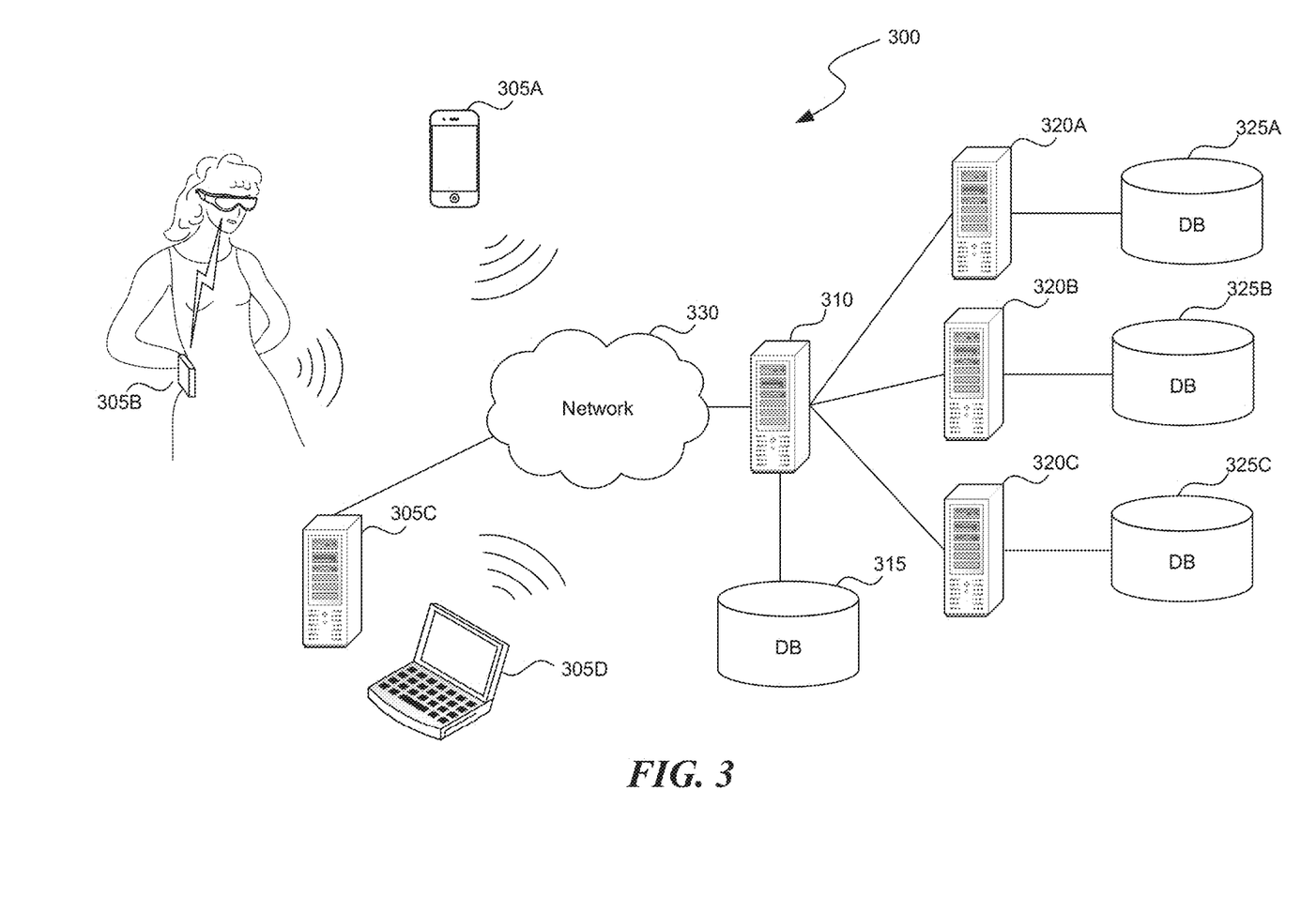
FIG. 3 is a block diagram illustrating an overview of an environment in which some implementations of the present technology can operate.

FIG. 3 is a block diagram illustrating an overview of an environment 300 in which some implementations of the disclosed technology can operate. Environment 300 can include one or more client computing devices 305A-D, examples of which can include computing system 100. In some implementations, some of the client computing devices (e.g., client computing device 305B) can be the HMD 200 or the HMD system 250. Client computing devices 305 can operate in a networked environment using logical connections through network 330 to one or more remote computers, such as a server computing device.

In some implementations, server 310 can be an edge server which receives client requests and coordinates fulfillment of those requests through other servers, such as servers 320A-C. Server computing devices 310 and 320 can comprise computing systems, such as computing system 100. Though each server computing device 310 and 320 is displayed logically as a single server, server computing devices can each be a distributed computing environment encompassing multiple computing devices located at the same or at geographically disparate physical locations.

Client computing devices 305 and server computing devices 310 and 320 can each act as a server or client to other server/client device(s). Server 310 can connect to a database 315. Servers 320A-C can each connect to a corresponding database 325A-C. As discussed above, each server 310 or 320 can correspond to a group of servers, and each of these servers can share a database or can have their own database. Though databases 315 and 325 are displayed logically as single units, databases 315 and 325 can each be a distributed computing environment encompassing multiple computing devices, can be located within their corresponding server, or can be located at the same or at geographically disparate physical locations.

Network 330 can be a local area network (LAN), a wide area network (WAN), a mesh network, a hybrid network, or other wired or wireless networks. Network 330 may be the Internet or some other public or private network. Client computing devices 305 can be connected to network 330 through a network interface, such as by wired or wireless communication. While the connections between server 310 and servers 320 are shown as separate connections, these connections can be any kind of local, wide area, wired, or wireless network, including network 330 or a separate public or private network.

Figure 4:
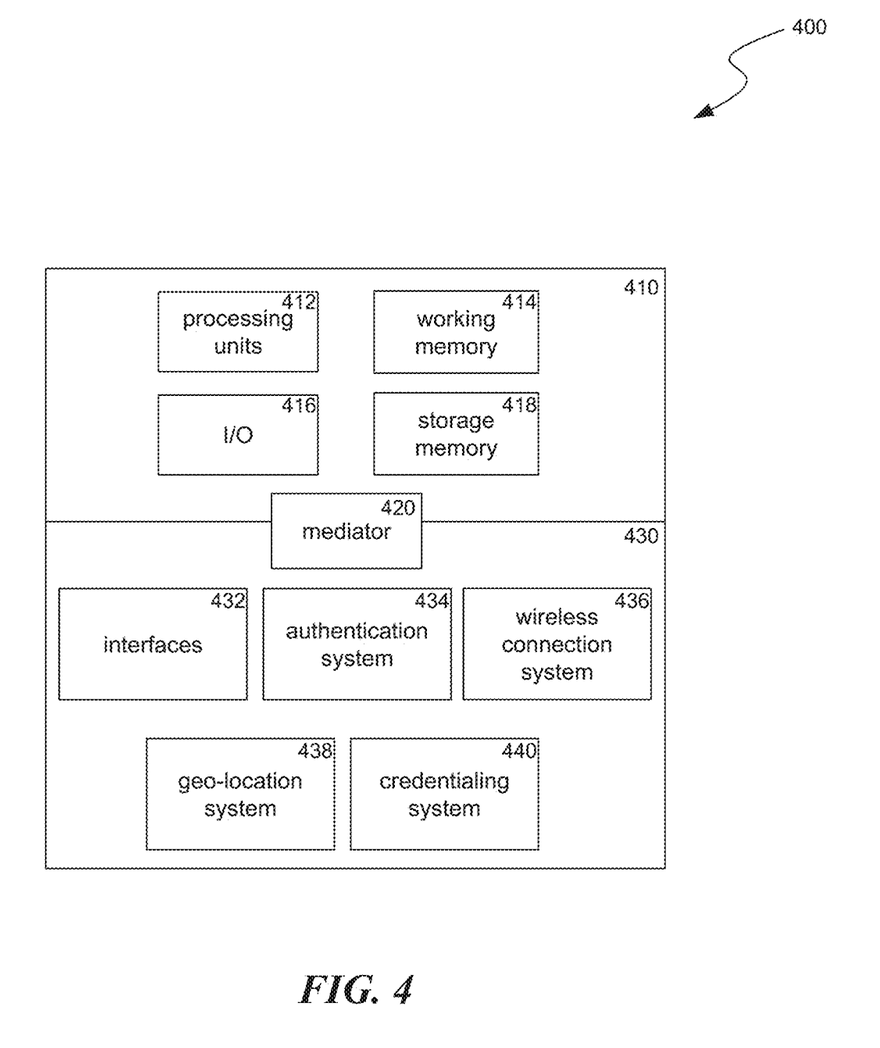
FIG. 4 is a block diagram illustrating components which, in some implementations, can be used in a system employing the disclosed technology.

FIG. 4 is a block diagram illustrating components 400 which, in some implementations, can be used in a system employing the disclosed technology. Components 400 can be included in one device of computing system 100 or can be distributed across multiple of the devices of computing system 100. The components 400 include hardware 410, mediator 420, and specialized components 430. As discussed above, a system implementing the disclosed technology can use various hardware including processing units 412, working memory 414, input and output devices 416 (e.g., cameras, displays, IMU units, network connections, etc.), and storage memory 418. In various implementations, storage memory 418 can be one or more of: local devices, interfaces to remote storage devices, or combinations thereof. For example, storage memory 418 can be one or more hard drives or flash drives accessible through a system bus or can be a cloud storage provider (such as in storage 315 or 325) or other network storage accessible via one or more communications networks. In various implementations, components 400 can be implemented in a client computing device such as client computing devices 305 or on a server computing device, such as server computing device 310 or 320.

Mediator 420 can include components which mediate resources between hardware 410 and specialized components 430. For example, mediator 420 can include an operating system, services, drivers, a basic input output system (BIOS), controller circuits, or other hardware or software systems.

Specialized components 430 can include software or hardware configured to perform operations for provisioning artificial reality devices. Specialized components 430 can include authentication system 434, wireless connection system 436, geo-location system 438, credentialing system 440, and components and APIs which can be used for providing user interfaces, transferring data, and controlling the specialized components, such as interfaces 432. In some implementations, components 400 can be in a computing system that is distributed across multiple computing devices or can be an interface to a server-based application executing one or more of specialized components 430.

Authentication system 434 can communicate with an administration system to authenticate an account associated with one or more artificial reality devices. In some implementations, the authentication system 434 can be part of an application executed by a mobile device (e.g., a mobile phone, laptop, etc.) or another provisioning device. The provisioning device can receive a list of the one or more artificial reality devices in response to the authentication.

Wireless connection system 436 can be controls for various types of wireless systems such as Bluetooth, WiFi, Near-Field Communication (NFC), ZigBee, Z-wave, or other connections between two devices that use wireless technology. Wireless connection system 436 can scan for and make wireless connections with artificial reality devices.

Geo-location system 438 can use the wireless connection system 436 to scan for artificial reality devices and compare identifiers for any artificial reality devices found in this scan with the list of artificial reality devices received following authentication. Geo-location system 438 can verify, based on these artificial reality devices being within wireless communication range, that the artificial reality devices are within a geographical distance defined by the scanned wireless range of the system 400. These verifications can be provided to an administration system and/or used as a condition for providing additional credentials to the verified artificial reality devices.

Credentialing system 440 can, in response to geo-location verifications from geo-location system 438, provide credentials to the verified artificial reality devices. For example, these can be WiFi credentials allowing the artificial reality devices to connect to a local WiFi network and/or credentials for the artificial reality devices to access provisioning content on an administration system. In response to receiving these credentials, artificial reality devices can connect to a network and communicate, over that network, with an administration system to receive software updates and/or configuration data. The artificial reality devices can apply those software updates and/or configurations to themselves.

In some implementations, hardware 410 can be part of another computing device such as an authentication system. In these instances, specialized components 430 can include other software modules. Some of these modules can be configured to interface with device distributors to associate artificial reality devices with accounts for organizations to which the artificial reality devices were provided (see e.g., blocks 502 and 504 discussed below). Additional authentication system modules can control accounts and account authorizations or provide artificial reality device lists to provisioning devices, to administer artificial reality device states (see e.g., blocks 508 and 517 discussed below). Yet other authentication system modules can serve software updates and configuration data to artificial reality devices (see e.g., blocks 522 and 528 discussed below).

In other instances, hardware 410 can be part of an artificial reality device, in which case the specialized components 430 can include modules that respond to wireless scans (see e.g., block 514 discussed below), that accept credentials from a provisioning device and use the credentials to retrieve and apply software updates and/or configuration data (see e.g., blocks 520, 524, 526, and 530 discussed below).

Those skilled in the art will appreciate that the components illustrated in FIGS. 1-4 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 5:
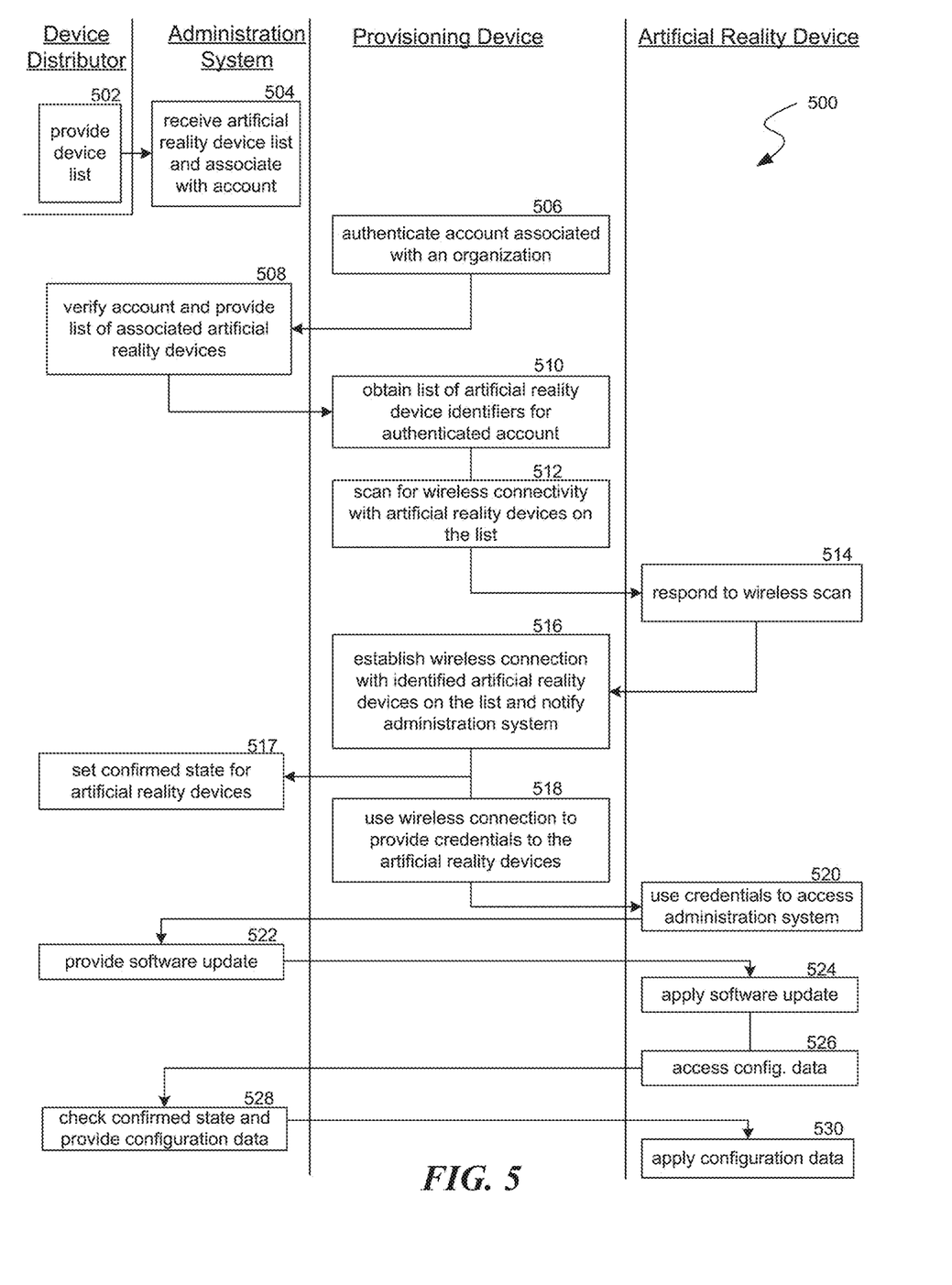
FIG. 5 is a flow diagram illustrating a process used in some implementations of the present technology for provisioning multiple artificial reality devices.

FIG. 5 is a flow diagram illustrating a process 500 used in some implementations of the present technology for configuring multiple artificial reality devices. FIG. 5 has two parts. The first part, blocks 502 and 504, includes interactions between a device distributor and an administration system. These actions can occur as the result of a device shipment from the device distributor or in response to the administration system querying the device distributor for device distributions (e.g., periodically, upon creation of an account for an organization, or an action at the administration system in relation to the organization account). This first part of process 500 begins at block 502, following one of these trigger events, with the device distributor providing a list of device identifiers (e.g., identifiers based on device serial numbers, MAC address identifiers, or some other unique identifier such as a concatenation of a manufacturer identifier with a count of the devices produced by that manufacturer). In various implementations, the distributor can be the device manufacturer, an intermediary associated with the administration system, a third-party reseller, etc. The device distributor can include with this device list an identifier for a user or organization to whom these devices were sent. The administration system, at block 504, can associate these device identifiers with an account corresponding to the user or organization identifier provided by the device distributor.

The second part of process 500, i.e., blocks 506-530, can be performed in response to a user beginning a provisioning process at a provisioning device. The provisioning process can begin at block 506 when the provisioning device starts authentication, with the administration system, for an account associated with an organization. For example, an organization can have its own account or a user account can have a designation as an administrator for an organization. In some implementations, the provisioning device can be a personal device, such as a mobile phone, tablet, laptop, etc. In some cases, the provisioning device can execute an application that will perform the steps of process 500 at the provisioning device. The application may have previously been authenticated with the administration system, so at block 506 process 500 can instead request a list of the artificial reality devices associated with the already authenticated account.

At block 508, process 500 can verify account credentials provided by the provisioning device at block 506, verify that the account is authorized to administer provisioning of artificial reality devices for an associated organization, and provide a list of those artificial reality devices back to the provisioning device.

At block 510, the provisioning device can obtain, from the administration system, a list of artificial reality device identifiers for the account authenticated at block 506. In various implementations, the artificial reality device identifiers can be device serial numbers (or modifications of device serial numbers such as hashes), MAC addresses, or other unique identifiers. At block 512, the provisioning device can scan for wireless connectivity with local artificial reality devices to identify any that are on the list. In various implementations, this can be accomplished using different wireless technologies, such as Bluetooth, WiFi, Near-Field Communication (NFC), ZigBee, Z-wave, or other connections between devices that use wireless technology. In some implementations, only wireless technologies with a limited wireless range (e.g., less than 100 meters, less than 150 meters, less than 200 meters) are used, making it unlikely that the wireless range extends to artificial reality devices of another organization during the provisioning process.

In response to the wireless scans at block 512 by the provisioning device, artificial reality devices that are powered on and are within wireless range of the provisioning device can respond with their device identifier. In some implementations, only artificial reality devices in a particular state, e.g., those that are designated for enterprise use or that have not been previously provisioned respond to the wireless scan.

At block 514, various artificial reality devices in range of the provisioning device can respond to the wireless scan initiated at block 512. For example, the artificial reality devices can supply an identifier (e.g., a serial number) to the provisioning device or can begin pairing (e.g., over Bluetooth) with the provisioning device.

At block 516, the provisioning device can verify that an artificial reality device that responded to the wireless scan provided an artificial reality device identifier that is on the list obtained at block 510. This verifies that the artificial reality device is within a geographical area defined by the maximum wireless range of the wireless technology used by the provisioning device to scan for the artificial reality devices (referred to herein as being "local" to the provisioning device). In response to this verification, the provisioning device can establish a wireless connection with the verified artificial reality device.

At block 516, the provisioning device can also send a message to the administration system to notify the administration system that the artificial reality device is local to the provisioning device. At block 517, in response to this message, the administration system can set a state for the artificial reality device indicating the artificial reality device is confirmed local to the provisioning device.

At block 518, the provisioning device can use the wireless connection established at block 516 to provide credentials to the artificial reality device. In various implementations, these can be WiFi or other network credentials. As used herein, "credentials" can be various types of digital keys such as username and password, an access token, an access certificate, a private key paired to a public key, etc. In some implementations, in addition to or instead of providing the network credentials to the artificial reality device, the provisioning device can provide the artificial reality device with credentials to access the administration system. In yet further instances, the provisioning device can send a message to the artificial reality device that causes the artificial reality device to link itself to the organization associated with the account with which the provisioning device authenticated at block 506. This linking can prevent other organizations from managing that artificial reality device. In some implementations, this linking can include providing the artificial reality device with an organization access token to use with the administration system, which will give the artificial reality device access to configuration data associated with the organization. In some implementations, the provisioning device can provide an address for the administration system along with the credentials or the artificial reality device can have an address for the administration system pre-programmed into it.

In some implementations, an artificial reality device can fail to connect to a local network with the credentials provided by the provisioning device. In some cases, this can cause the provisioning device to provide an alternate set of credentials for the same or a different local network. In other implementations, this can cause an error or other alert, prompting a user of the provisioning device to enter other credentials for the same or an alternate local network that the provisioning device can provide to the artificial reality device. In some implementations, if one artificial reality device notifies the provisioning device that it was unable to access a local network with the credentials provided, the provisioning device can cause the other local artificial reality devices to pause their provisioning process until a new set of credentials have been provided to them.

At block 520, an artificial reality device can receive credentials, from the provisioning device, over the wireless connection established at block 516. The artificial reality device can use these credentials to connect to a local network (e.g., a WiFi network, a ZigBee, Z-wave network or other mesh network, a Bluetooth network, etc.) The artificial reality device can then access the administration system using the local network, which may include sending messages over a wide area network, such as the internet. In some implementations, as an alternative to connecting to the local network, the artificial reality device can use the wireless connection to the provisioning device, established at block 516, where the provisioning device acts as an intermediary relaying messages (e.g., for provisioning) between the artificial reality device and administration system. In some implementations, the artificial reality device can automatically connect to the address of the administration system upon receiving the credentials and can request either or both available software updates and/or configuration data.

In various implementations, blocks 512-520 can be performed in sequence, connecting to and providing credentials to each local artificial reality device on the list, or blocks 512-520 can be performed in parallel connecting to and providing credentials for multiple of the local artificial reality devices at the same time.

At block 522, the administration system can receive an identification of a current software configuration from the artificial reality device and can provide any available software updates (referred to as over-the-air or OTA updates). At block 524, the artificial reality device can apply the received software update, which can include various activities such as unpackaging, installing, setting parameters, restarting, etc.

At block 526, process 500 can access configuration data from the administration system. In some implementations, this is accomplished using the access token provided to the artificial reality device at block 518. At block 528, the administration system can receive the request for configuration data from the artificial reality device, verify that a state was set for this artificial reality device at block 517 signifying that the artificial reality device is local to the provisioning device, and can provide back the configuration data associated with the account associated with the provisioning device. At block 530, the artificial reality device can apply the received configuration data, which can include various activities such as unpackaging, installing, setting parameters, restarting, etc. In some implementations, instead of having separate requests and responses for the software update and configuration data, these can be performed using a single request from the artificial reality device. In other implementations, the administration system can be split with one system (e.g., associated with the device manufacturer) providing software updates and another system (e.g., a server associated with an organization the artificial reality device has been linked to) providing organization-specific configuration data.

Figure 6:
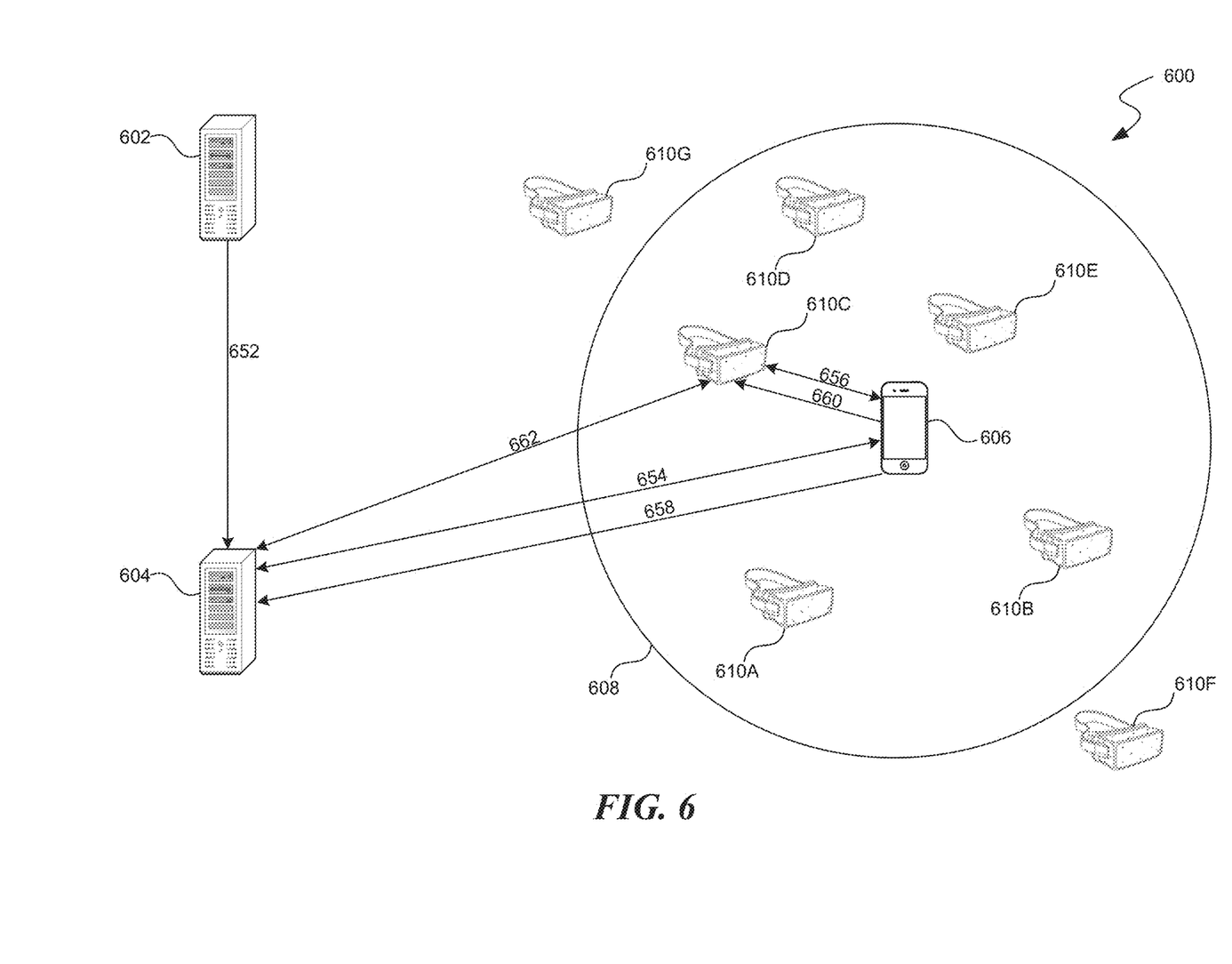
FIG. 6 is a conceptual diagram illustrating an example of provisioning multiple artificial reality devices.

FIG. 6 is a conceptual diagram illustrating an example 600 of configuring multiple artificial reality devices. Example 600 includes a server 602 for a device distributor, an administration system 604, a provisioning device (mobile phone) 606 that has a wireless (e.g., Bluetooth) range 608, and multiple artificial reality devices 610A-610G.

Example 600 begins at step 652 with the device distributor server 602 providing, to the administration system 604, a list of artificial reality devices. The list of artificial reality devices also includes an identifier for an organization to which the device distributor provided the artificial reality devices. The administration system 604 associates the list of artificial reality devices with an account associated with the organization.

At step 654, an application executed by the provisioning device 606 is authenticated with the account associated with the organization on the administration system 604 and receives the list of artificial reality devices provided by the device distributor to the organization.

At step 656, the provisioning device 606 initiates a Bluetooth scan for devices in area 608 (the maximum range of Bluetooth scanning for provisioning device 606). Each of devices 610A-10E respond as they have been powered on and are within the wireless range 608. Devices 610F and 610G do not respond as they are not in wireless range 608. In example 600, the provisioning device 606 sequentially steps through each of the artificial reality devices that responded and determines whether that device is on the list of artificial reality devices from the administration system 604. Provisioning device 606 begins by verifying that artificial reality device 610C corresponds to a device identifier provided by the artificial reality device 610C and sets up a Bluetooth connection with the artificial reality device 610C.

At step 658, having verified the artificial reality device 610C is within Bluetooth range and is on the list, provisioning device 606 indicates this verified device status for artificial reality device 610C in a message to the administration system 604. The administration system 604, in response, sets a confirmed state for the artificial reality device 610C.

At step 660, the provisioning device 606 provides WiFi credentials to the artificial reality device 610C. The artificial reality device 610C then uses the WiFi credentials to connect to a local WiFi network, and through that network, to the administration system 604. The artificial reality device 610C then retrieves and applies a software update from the administration system 604. Also, the artificial reality device 610C retrieves and applies a set of configurations specified by the organization the artificial reality device 610C is associated with. The administration system 604 allows access to this set of configurations due to the confirmed state of the artificial reality device 610C that was set at step 658. The artificial reality device 610C is now provisioned.

Following providing the WiFi credentials to the artificial reality device 610C at step 660, the provisioning device 606 can disconnect from the artificial reality device 610C and move on to the next artificial reality device in the wireless range, repeating the list verification, connection, and providing credentialing processing. The provisioning device 606 can repeat this for each artificial reality device on the list that is in the wireless range or that comes into the wireless range.

Reference in this specification to "implementations" (e.g., "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

While the systems and processes described herein refer to artificial reality devices, the provisioning described herein can be applied for other type of devices as well, such as mobile phones, wearable devices, laptops, consumer electronics, etc.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for configuring two or more artificial reality devices, the method comprising:
   obtaining a list of artificial reality device identifiers corresponding to an authenticated account, wherein the list of artificial reality device identifiers was provided by an administration system;
   confirming, based on the list of artificial reality device identifiers, that multiple artificial reality devices are within a geographical area of a provisioning device, wherein the confirming is based on scanning for wireless connectivity to determine that the multiple artificial reality devices are within a wireless range of the provisioning device;
   establishing wireless connections between the provisioning device and the multiple artificial reality devices; and
   providing, via the wireless connections, credentials to each of the multiple artificial reality devices, wherein providing the credentials causes each of the multiple artificial reality devices to obtain a software update and configuration data for that artificial reality device.

2. The method of claim 1, wherein the list of artificial reality device identifiers is obtained via a device distributor that provided the multiple artificial reality devices to an organization associated with the account.

3. The method of claim 1, further comprising sending messages to each of the multiple artificial reality devices, wherein each message causes a particular artificial reality device, of the multiple artificial reality devices, to be linked to a particular organization and prevents other organizations from managing that particular artificial reality device.

4. The method of claim 3,
   wherein the artificial reality device receives a first provisioning request associated with a second organization other than the particular organization and, based on the link to the particular organization, rejects the provisioning; and
   wherein the artificial reality device receives a second provisioning request associated with the particular organization and, based on the link to the particular organization, validates an identity of the particular organization and allows the second provisioning request to proceed.

5. The method of claim 1,
   wherein the credentials are credentials for a WiFi network, and
   wherein providing the credentials causes each of the multiple artificial reality devices to obtain the software update comprising an over the air update using the WiFi network.

6. The method of claim 1 further comprising, in response to obtaining the list of artificial reality device identifiers, initiating a Bluetooth scan to identify any artificial reality devices corresponding to the artificial reality device identifiers, wherein each of the wireless connections is a Bluetooth connection formed as a result of the Bluetooth scan.

7. The method of claim 6 wherein each Bluetooth connection is used to provide either or both of the software updates and/or the configuration data to the multiple artificial reality devices.

8. The method of claim 1 further comprising sending a message to the administration system indicating that a particular artificial reality device, of the multiple artificial reality devices, is within the wireless range of the provisioning device, wherein the administration system, in response to the message, sets a state for the particular artificial reality device to a confirmed state.

9. The method of claim 8, wherein the particular artificial reality device automatically connects with the administration system and receives one or more responses with an indication that the particular artificial reality device is associated with a particular organization, an indication that the particular artificial reality device has the confirmed state, and a device access token.

10. The method of claim 9, wherein the particular artificial reality device uses the device access token to access the configuration data from the administration system.

11. The method of claim 1, wherein the provisioning device is a mobile phone executing an application that a user used to authenticate the account.

12. The method of claim 1,
wherein the credentials are a second set of credentials; and
wherein the method further comprises:
   determining that a first set of credentials for a WiFi network failed to allow one of the multiple artificial reality devices to access the WiFi network; and
   following the determining, receiving the second set of credentials, from a user, to include in the providing of the second set of credentials to each of the multiple artificial reality devices.

13. The method of claim 12 further comprising, in response to the determining that the first set of credentials for the WiFi network failed to allow one of the multiple artificial reality devices to access the WiFi network, causing each of the others of the multiple artificial reality devices to pause a provisioning process until the second set of credentials have been provided to that one of the others of the multiple artificial reality devices.

14. A non-transitory computer-readable storage medium storing instructions that, when executed by a computing system, cause the computing system to perform operations for configuring two or more wireless enabled devices, the operations comprising:
   obtaining a list of wireless enabled device identifiers corresponding to an authenticated account, wherein the list of artificial reality device identifiers was provided by an administration system;
   confirming, based on the list of wireless enabled device identifiers, that multiple wireless enabled devices are within a geographical area of a provisioning device, wherein the confirming is based on scanning for wireless connectivity to determine that the multiple wireless enabled devices are within a wireless range of the provisioning device;
   establishing wireless connections between the provisioning device and the multiple wireless enabled devices; and
   providing, via the wireless connections, credentials to each of the multiple wireless enabled devices, wherein providing the credentials causes each of the multiple wireless enabled devices to obtain a software update and configuration data for that wireless enabled device.

15. The non-transitory computer-readable storage medium of claim 14, wherein the operations further comprise sending messages, to each of the multiple artificial reality devices, that each causes a particular artificial reality device, of the multiple artificial reality devices, to be linked to a particular organization and prevents other organizations from managing that particular artificial reality device.

16. The non-transitory computer-readable storage medium of claim 14,
wherein the operations further comprise, in response to obtaining the list of artificial reality device identifiers, initiating a Bluetooth scan to identify any artificial reality devices corresponding to the artificial reality device identifiers; and
wherein each of the wireless connections is a Bluetooth connection formed as a result of the Bluetooth scan.

17. The non-transitory computer-readable storage medium of claim 14,
wherein the operations further comprise sending a message to the administration system indicating that a particular artificial reality device, of the multiple artificial reality devices, is within the wireless range of the provisioning device;
wherein the administration system, in response to the message, sets a state for the particular artificial reality device to a confirmed state;
wherein the particular artificial reality device automatically connects with the administration system and receives one or more responses with an indication that the particular artificial reality device is associated with a particular organization, an indication that the particular artificial reality device has the confirmed state, and a device access token; and
wherein the particular artificial reality device uses the device access token to access the configuration data from the administration system.

18. A computing system for configuring two or more artificial reality devices, the computing system comprising:
   one or more processors; and
   one or more memories storing instructions that, when executed by the one or more processors, cause the computing system to perform operations comprising:
      obtaining a list of artificial reality device identifiers corresponding to an authenticated account, wherein the list of artificial reality device identifiers was provided by an administration system;
      confirming, based on the list of artificial reality device identifiers, that multiple artificial reality devices are within a wireless range of a provisioning device, wherein the confirming that the multiple artificial reality devices are within the wireless range of the provisioning device is based on scanning for wireless connectivity;
      establishing wireless connections between the provisioning device and the multiple artificial reality devices; and
      providing, via the wireless connections, credentials to each of the multiple artificial reality devices, wherein providing the credentials causes each of the multiple artificial reality devices to obtain a software update ands configuration data for that artificial reality device.

19. The computing system of claim 18,
wherein the operations further comprise, in response to obtaining the list of artificial reality device identifiers, initiating a Bluetooth scan to identify any artificial reality devices corresponding to the artificial reality device identifiers; and wherein each of the wireless connections is a Bluetooth connection formed as a result of the Bluetooth scan.

20. The computing system of claim 18, wherein the operations further comprise sending a message to the administration system indicating that a particular artificial reality device, of the multiple artificial reality devices, is within the wireless range of the provisioning device;

wherein the administration system, in response to the message, sets a state for the particular artificial reality device to a confirmed state;

wherein the particular artificial reality device automatically connects with the administration system and receives one or more responses with an indication that the particular artificial reality device is associated with a particular organization, an indication that the particular artificial reality device has the confirmed state, and a device access token; and wherein the particular artificial reality device uses the device access token to access the configuration data from the administration system.

\* \* \* \* \*